(12) United States Patent
Zabiega (10) Patent No.: US 7,609,452 B2
(45) Date of Patent: Oct. 27, 2009

(54) 3D GAUGE FACE FOR VEHICLE DASHBOARD

(75) Inventor: Matthew Zabiega, Redford, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 361 days.

(21) Appl. No.: 11/450,864

(22) Filed: Jun. 12, 2006
(Under 37 CFR 1.47)

(65) Prior Publication Data

US 2007/0284169 A1 Dec. 13, 2007

(51) Int. Cl.
*G02B 27/10* (2006.01)
*G02B 27/14* (2006.01)
*G09G 5/00* (2006.01)

(52) U.S. Cl. .............................. 359/630; 359/619; 345/7

(58) Field of Classification Search .................. 359/619, 359/630–633; 345/7–9; 353/28
See application file for complete search history.

(56) References Cited

U.S. PATENT DOCUMENTS

| | | | |
|---|---|---|---|
| 5,642,226 A | 6/1997 | Rosenthal | |
| 6,084,713 A | 7/2000 | Rosenthal | |
| 6,288,842 B1 | 9/2001 | Florczak et al. | |
| 6,894,615 B2 | 5/2005 | Look | |
| 7,036,944 B2 | 5/2006 | Budd et al. | |
| 7,333,268 B2 * | 2/2008 | Steenblik et al. | 359/619 |
| 7,336,422 B2 * | 2/2008 | Dunn et al. | 359/626 |
| 2002/0054434 A1 | 5/2002 | Florczak et al. | |
| 2005/0040940 A1 * | 2/2005 | Sonobe | 340/438 |

* cited by examiner

*Primary Examiner*—Alicia M Harrington
(74) *Attorney, Agent, or Firm*—Nixon & Vanderhye P.C.

(57) ABSTRACT

A system and/or method that displays images in a vehicle dashboard area that appear, to an operator of the vehicle, to float above and/or below the vehicle's gauge face in a three-dimensional manner. In certain example embodiments, a system and/or method is provided wherein a gauge face includes a first sheet (e.g., vinyl sheet) having images laser-etched therein based on a design template, and a second sheet (e.g., polycarbonate sheet) to which the first sheet is applied. In certain example embodiments, when light from a dashboard backlight shows through the gauge face, the one or more of the laser-etched images appear to float above and/or below the gauge face in a three dimensional manner. In certain example embodiments, the images can be used in combination with and/or in place of conventional digital and/or analog gauges.

14 Claims, 8 Drawing Sheets

Vehicle Interior

3D GAUGE FACE FOR VEHICLE DASHBOARD

FIELD OF THE INVENTION

This invention relates to a system and/or method that displays images that appear to float above and/or below a vehicle's gauge face (or dashboard), and/or a system and/or method of making the same. In certain example embodiments of this invention, a system and/or method is provided wherein a gauge face comprises a vinyl inclusive sheet having images laser-etched therein based on a design template, and a polycarbonate inclusive sheet to which the vinyl sheet is applied either directly or indirectly. In certain example embodiments, when light shows through the gauge face from a backlight of the dashboard, at least some of the laser-etched images appear to float above and/or below the gauge face.

BACKGROUND AND SUMMARY OF EXAMPLE EMBODIMENTS OF THE INVENTION

Gauge faces in vehicles conventionally convey a certain set of information about the vehicles in which they are located. That information may include variable information, such as, for example, speed, level of fuel, engine temperature, warning signals, etc. It also may include basic status information, such as, for example, whether there is an engine problem, whether oil is low, whether safety belts are fastened, etc. The information may be conveyed using analog and/or digital displays. This information, though often taken for granted, often may be critical to maintaining the proper functioning of vehicles, and/or operator safety.

Such vehicle dashboard displays have been relatively the same since the vehicles first began reporting such information. In many instances, display techniques for vehicle dashboards are not particularly aesthetically pleasing to the viewer. Thus, it is possible that vehicle operators may sometimes become bored and/or disinterested in the gauges and/or other information being displayed on the vehicle dashboard.

Thus, it will be appreciated that there exists a need in the art for a system of gauges and/or a method of making the same to overcome these and/or other disadvantages. In particular, there exists a need in the art for a more aesthetically pleasing system of displaying vehicle dashboard information. This may be accomplished by, for example, providing more exciting/interesting gauge faces, displays, images, and the like, which may interest the vehicle operator in the functioning of the vehicle without interfering with the operation of the vehicle.

Certain example embodiments provide a method of making a gauge face for a vehicle, with the method comprising laser-etching a designed pattern into a first sheet to create a microlens array, the designed pattern comprising one or more images; applying the first sheet to a second sheet; connecting at least one sensor to at least one light source, the at least one sensor being operable to measure a status associated with the vehicle; and, placing the at least one light source at a location in the vehicle to cause one or more of the images to appear to be floating above and/or below the gauge face when the at least one light source is turned on. In certain non-limiting embodiments, the method may further comprise mounting the gauge face in the vehicle. In certain non-limiting embodiments, at least one sensor is operable to measure at least one of speed, actuation of a turn signal, actuation of high beams, engine temperature, fuel level, engine trouble, and/or safety belt status. In certain non-limiting embodiments, the images displayed vary at least on one or more of the presence and/or absence of light, the amount of light, and/or the viewing angle.

Certain example embodiments provide a gauge face for a vehicle, comprising a first sheet laser-etched with a designed pattern comprised of a plurality of images, the first sheet being applied to a second substantially transparent sheet; wherein the one or more the images in the designed pattern appear as floating above and/or below the gauge face when illuminated. In certain non-limiting embodiments, the first sheet is a vinyl sheet, and in certain non-limiting embodiments, the second sheet is a polycarbonate sheet. In certain non-limiting embodiments, the gauge face further comprises a third sheet applied to the first sheet opposite the second sheet, and in certain non-limiting embodiments, the first sheet is a retroreflective sheet.

Certain example embodiments provide a method of displaying images that float above and/or below a gauge face of a vehicle to indicate the vehicle's status, with the method comprising mounting the gauge face comprised of images in the vehicle; sensing the vehicle's status; and, actuating one or more lights in response to the vehicle's status as sensed. In certain non-limiting embodiments, the images are not visible before one or more of the lights is actuated. In certain non-limiting embodiments, already visible images change in appearance based on one or more of the light's presence, absence, and/or amount.

Certain example embodiments provide a system for displaying images that float above and/or below a gauge face of a vehicle, comprising a first sheet laser-etched with a designed pattern, the first sheet being applied to a second substantially transparent sheet; a plurality of sensors, operable to determine the status of one or more aspects and/or functions of the vehicle; and, a plurality of lighting elements operably connected to the sensors; wherein the designed pattern comprises at least one image, and wherein the plurality of lighting elements cause one or more the images in the designed pattern to appear as floating above and/or below the gauge face when illuminated. In certain non-limiting embodiments, the plurality of sensors is operable to measure at least one of speed, actuation of a turn signal, actuation of high beams, engine temperature, fuel level, engine trouble, and/or safety belt status. In certain non-limiting embodiments, the plurality of lighting elements are separated from each other.

BRIEF DESCRIPTION OF THE DRAWINGS

These and other features and advantages will be better and more completely understood by reference to the following detailed description of exemplary illustrative embodiments in conjunction with the drawings, of which.

DETAILED DESCRIPTION OF EXAMPLE EMBODIMENTS OF THE INVENTION

1. Example Gauge Faces and Methods

Figure 1:
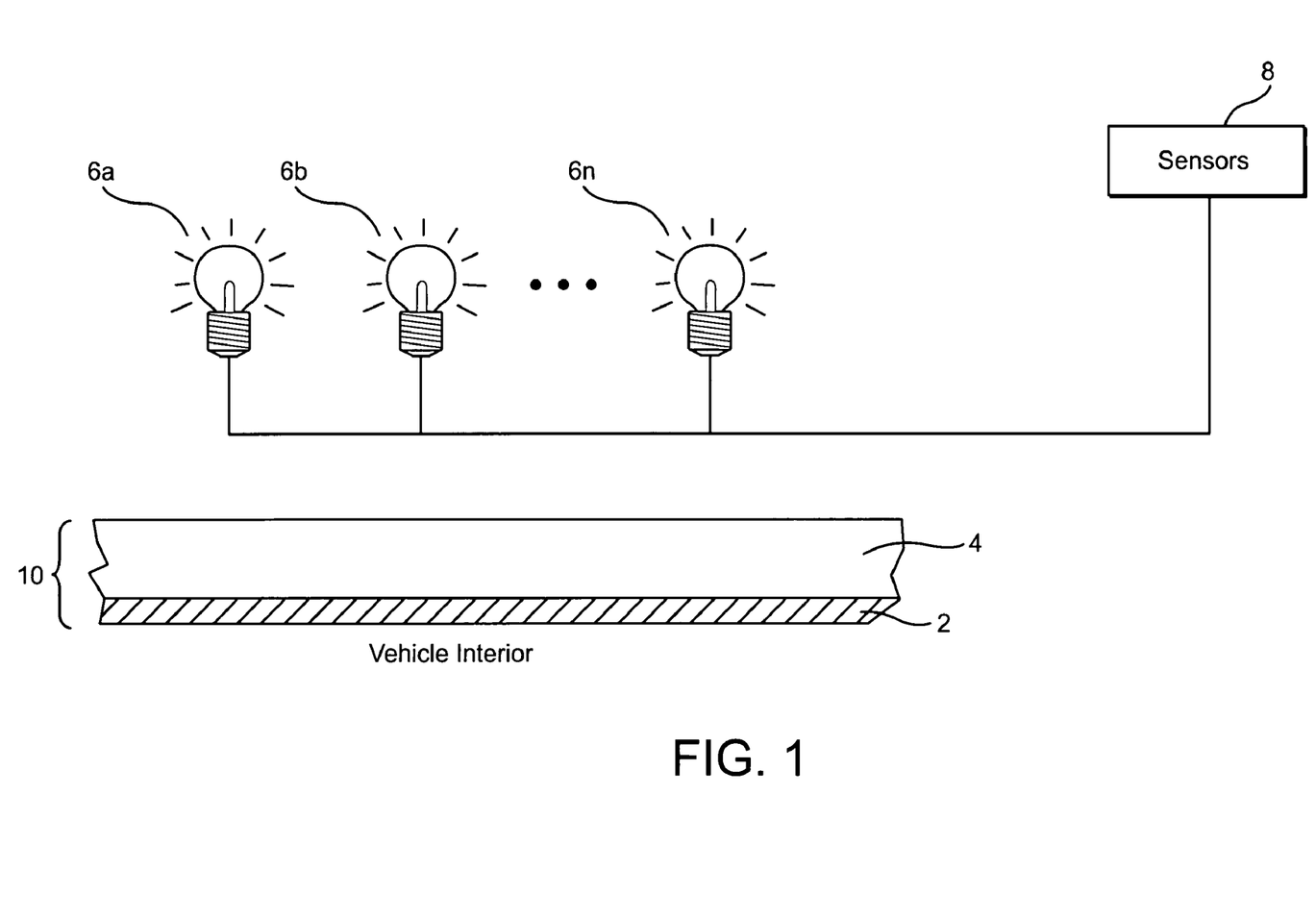
FIG. 1 is a partial schematic view of an illustrative 3D gauge system with vehicle circuitry in accordance with an example embodiment.

Referring now to the drawings, FIG. 1 is a partial schematic view of an illustrative 3D gauge system with vehicle circuitry in accordance with an example embodiment. In FIG. 1, gauge face 10 comprises image layer 2 and substrate 4. Image layer may have images that appear to float above and/or below gauge face 10 when illuminated. In a preferred embodiment, image layer 2 is a laser-etched vinyl sheet available from 3M and marketed under the trade name Scotchlite. In an example embodiment, substrate 4 is a polycarbonate sheet that has been cut to the gauge face specifications (e.g. appropriate size, shape, etc.). Image layer 2 may be applied to substrate 4. A protective outer substrate (not shown) may protect image layer 2 from damage, tampering, etc. It will be appreciated that image layer 2 may be transparent, translucent, etc. and substrate 4 and the optional protective substrate may not substantially alter the transmissive, reflective, and/or refractive properties of the light sources.

A plurality of lighting elements 6a-6n may be disposed behind (e.g. away from the interior of the vehicle) gauge face 10. Lighting elements 6a-6n optionally may be separated from each other to prevent the lighting of multiple images inappropriately. Lighting elements 6a-6n may be operably connected to sensors 8. Sensors 8 may detect, for example, amount of fuel, engine temperature, whether high beams are on, etc. Based on a signal from sensor 8, a subset of lighting elements 6a-n may become activated. The lighting elements 6a-6n may be disposed to illuminate the images comprising (e.g. laser-etched into) image layer 2. Proper illumination of the images may make them appear as floating above and/or below gauge face 10. Example techniques for making images appear to float above and/or below gauge face 10 via the use of transmitted light will be described below with reference to FIGS. 3-8.

Figure 2:
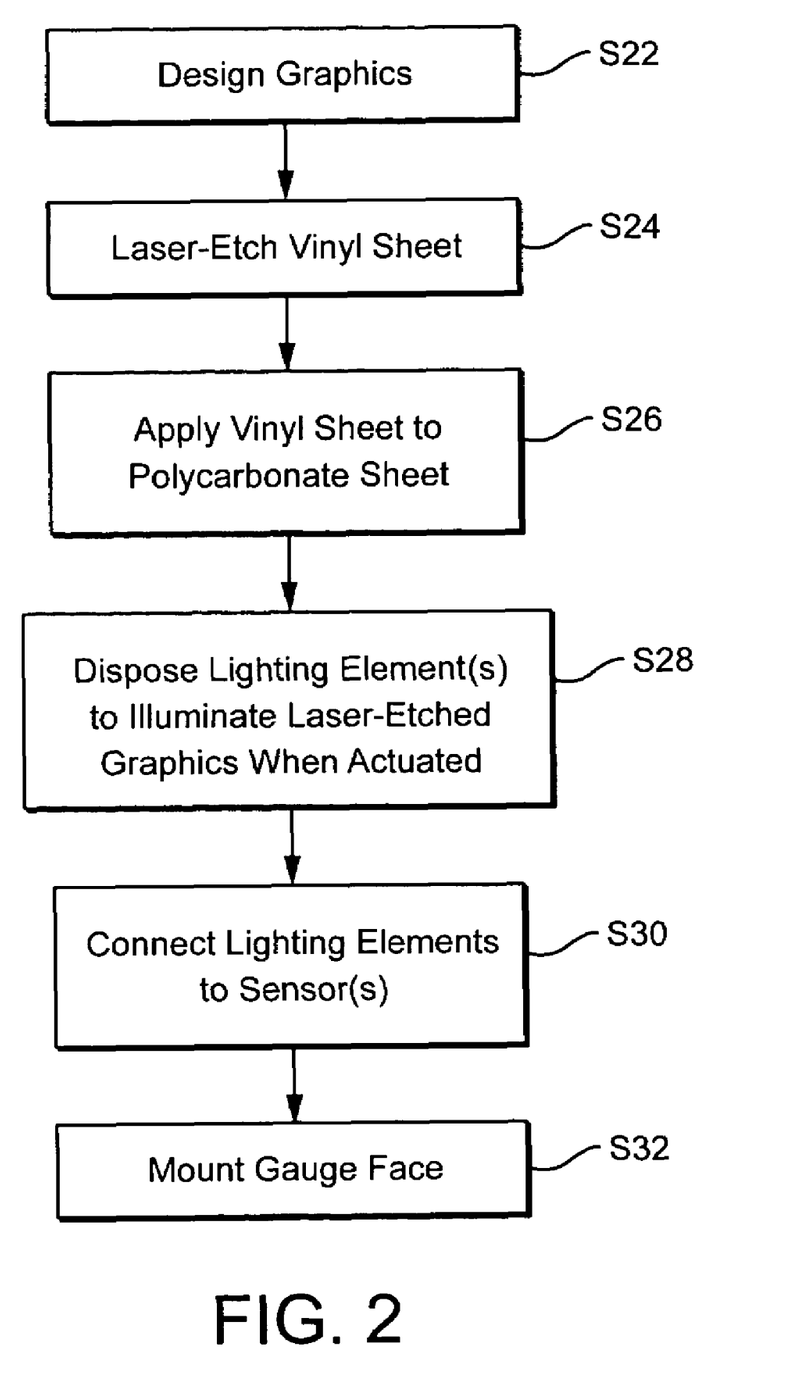
FIG. 2 is a illustrative flowchart showing a process for creating a gauge face in accordance with an example embodiment.

FIG. 2 is a illustrative flowchart showing a process for creating a gauge face in accordance with an example embodiment. The graphics to be displayed (e.g. an oil can to indicate whether the vehicle is low on oil, a person strapped into a seat to indicate whether a passenger's safety belt is buckled, etc.) are designed in step S22. In step S24, those images are laser-etched onto vinyl sheets. Those vinyl sheets are applied to polycarbonate sheets (which may be pre-cut to appropriate gauge face specifications in a step not shown) in step S26.

In step S28, one or more lighting elements are disposed in the vehicle to illuminate the laser-etchings when the appropriate one or more lighting elements are actuated. In certain example embodiments, one lighting element may be capable of illuminating multiple images at once (e.g. images in proximity to one another that will always be on at the same time). In certain example embodiments, lighting elements may be actuated (or turned off) in series to indicate, for example, increasing speed, decreasing fuel levels, etc. The one or more lighting elements may be connected to sensors that direct the one or more lighting elements whether and/or when to turn on or off in step S30. The gauge face may be mounted in step S32 after such connections between the lighting elements and the sensors are made.

2. Examples of Techniques for Creating Floating Images

Any number of techniques may be used to create the illusions of images floating above and/or below the gauge face. A preferred embodiment may use the techniques disclosed in U.S. Pat. No. 6,288,842 and Publication No. 2002/0054434, each incorporated in its entirety herein by reference. For example, a lens array can be fabricated by an etching process to produce a monolithic array of lenses in a microlens sheet.

In a preferred embodiment, the sheet to be etched will comprise a vinyl sheet (e.g. a vinyl laminate). Such sheets may make use of retroflective technology, essentially creating an optically variable device (OVD), for example, allowing images to appear to be floating above and/or below the surface of the sheets. Retroflective laminates, in general, also allow images to change based at least in part on, for example, viewing angle, intensity of light, etc.

Retroflective materials and methods of making the same are disclosed in U.S. Pat. Nos. 6,894,615 and 7,036,944, each incorporated in its entirety herein by reference. Preferably, the sheets will be laminates or capable of being applied to other surfaces (e.g. polycarbonate sheets). Preferably, the other surfaces are transparent or substantially transparent (e.g. to allow for light to be transmitted from behind the gauge face out toward the operator, to allow the image to appear cleanly and/or clearly, etc.) and do not substantially alter the properties of the applied sheets (e.g. do not alter the properties of the monolithic microlens array). These features are important because, for example, altering the properties of a retroflective laminate may cause the images to appear to be misaligned, out of focus, darker, washed out, etc.

Similar materials and method of making the same have been successfully used by 3M for security purposes (e.g. authentication of goods by means of a label) under the trade name "Confirm." For example, Australia now uses a retroflective security laminate with floating images for its M series passports.

2.1 Creating and Displaying Composite Images that Float Above the Gauge Face

Figure 3:
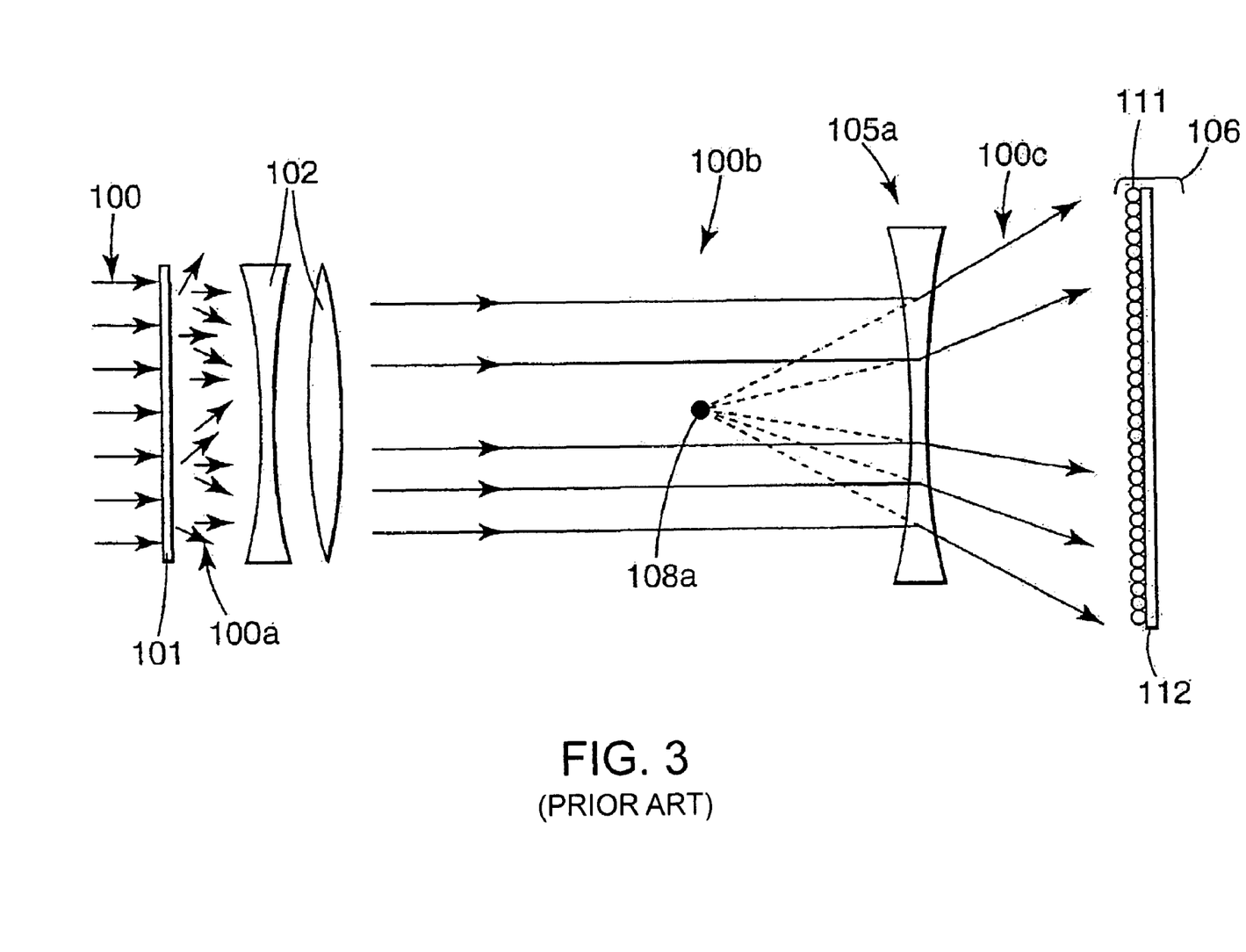
FIG. 3 is a geometrical optical representation of the formation of a composite image that appears to float above a microlens sheeting.

FIGS. 3-6 help describe the processes of creating and viewing images that float above and/or below the gauge face. In particular, FIG. 3 is a geometrical optical representation of the formation of a composite image that appears to float above a microlens sheeting. In FIG. 3, incident energy 100 (in certain example embodiments, incident energy 100 may be produced from one or more lights) is directed onto light diffuser 101 to correct for (e.g. homogenize) any non-uniformities in the light source. The diffusely scattered light 100a is captured and collimated by light collimator 102 that directs uniformly distributed light 100b towards diverging lens 105a. From the diverging lens, light rays 100c diverge toward microlens sheeting 106.

The energy of the light rays impinging upon microlens sheeting 106 is focused by individual microlenses 111 onto the material layer (radiation sensitive coating 112, e.g. comprised of vinyl in certain example embodiments). This focused energy modifies radiation sensitive coating 112 to provide an image, the size, shape, appearance, etc. of which depend at least in part on the interaction between the light rays and the radiation sensitive coating. This arrangement may provide a sheeting having a composite image that appears to float above the sheeting because diverging rays 100c, if extended backward through the lens, would intersect at the focal point 108a of the diverging lens. The image could be ray-traced to 108a, which is where the composite image appears.

Figure 4:
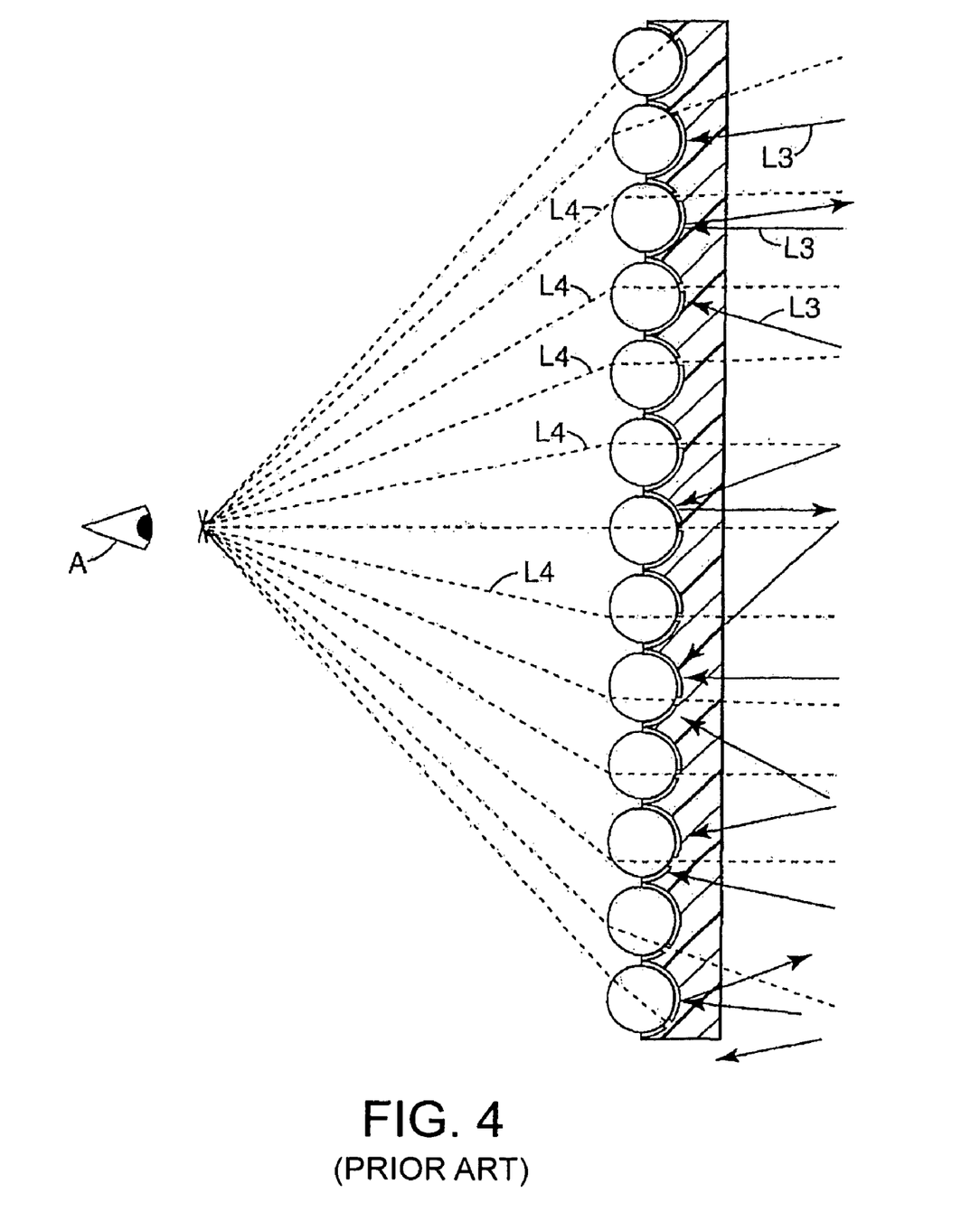
FIG. 4 is a schematic representation of a sheeting having a composite image that appears to float above the sheeting when the sheeting is viewed in transmitted light.

Certain images etched in the imaged sheetings can be viewed by transmitted light. FIG. 4 is a schematic representation of a sheeting having a composite image that appears to float above the sheeting when the sheeting is viewed in, transmitted light. For example, when the imaged portions of the material layer are translucent and the non-imaged portions are not, then most light L3 will be absorbed and/or reflected by the material layer, while transmitted light L4 will be passed through the imaged portions of the material layer and directed by the microlenses toward focal point 108a. The composite image will be apparent at the focal point, where it may appear brighter than the remainder of the sheeting. This composite image is a "real image" inasmuch as actual light (not the absence of light) creates the image at the focal point.

If the imaged portions of the material layer are not translucent but the remainder of the material layer is, the absence of transmitted light in the areas of the images may provide a composite image that appears darker than the remainder of the sheeting. It will be appreciated that in certain example embodiments, a composite image also may be viewed using light that impinges on the sheeting from the same side as the observer (reflected light) and/or from the opposite side of the sheeting as the observer (transmitted light).

2.2 Creating and Displaying Composite Images that Float Below the Gauge Face

Figure 5:
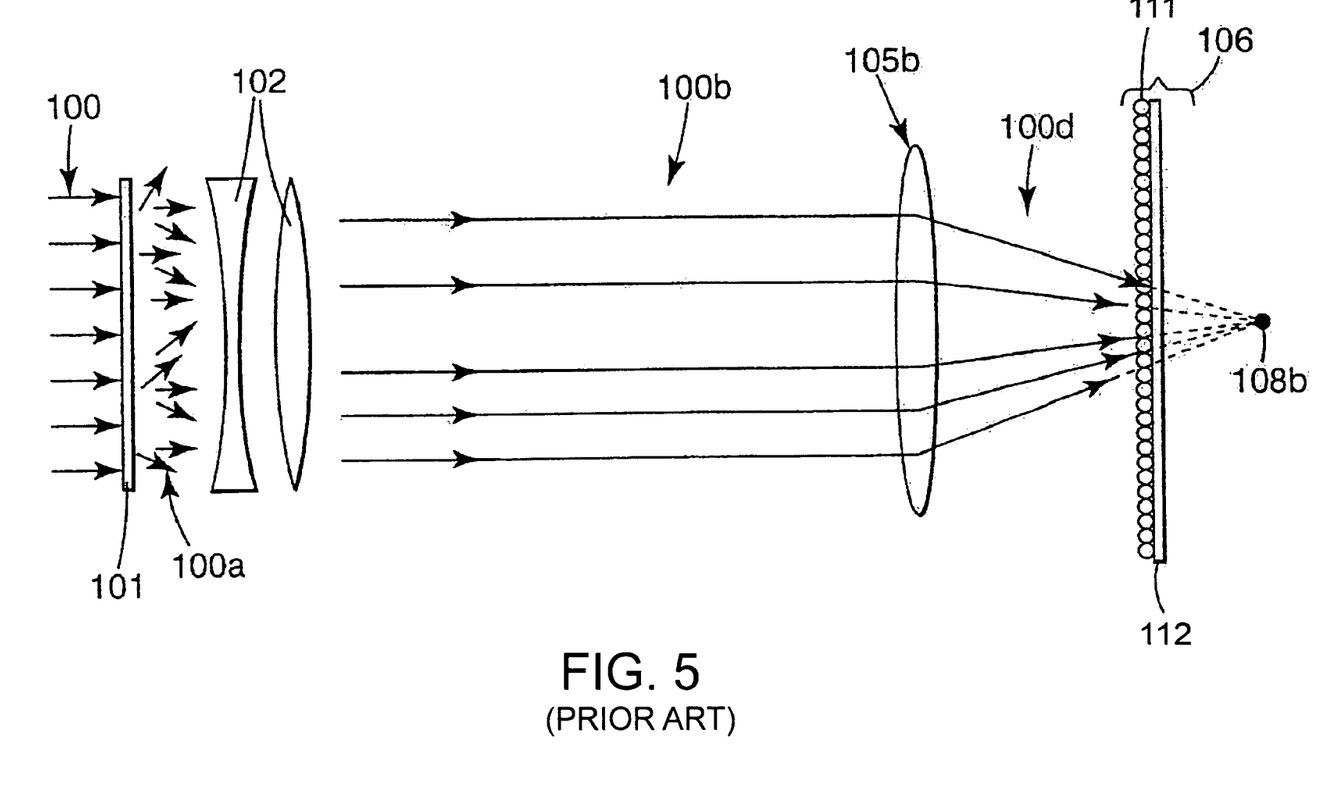
FIG. 5 is a geometrical optical representation of the formation of a composite image that when viewed will appear to float below a microlens sheeting.

A composite image that appears to float below the gauge face also may be provided. This floating image that floats below the sheeting may be created by using a converging lens instead of diverging lens 105 shown in FIG. 3. Referring now to FIG. 5, which is a geometrical optical representation of the formation of a composite image that when viewed will appear to float below a microlens sheeting, incident energy 100 (light, in this example embodiment) is directed onto diffuser 101 to correct for (e.g. homogenize) any non-uniformities in the light source. Diffuse light 100a then is collected and collimated in collimator 102 that directs light 100b toward converging lens 105b. From the converging lens, light rays 100d are incident on microlens sheeting 106, which is placed between the converging lens and focal point 108b of the converging lens.

The energy of the light rays impinging upon microlens sheeting 106 is focused by individual microlenses 111 onto the material layer (a radiation sensitive coating 112, e.g. a vinyl sheet in certain example embodiments). This focused energy modifies radiation sensitive coating 112 to provide an image, the size, shape, appearance, etc. of which depend at least in part on the interaction between the light rays and the radiation sensitive coating. This arrangement can provide a sheeting having a composite image that appears to float below the sheeting because converging rays 100d, if extended through the sheeting, may intersect at focal point 108b of the diverging lens. The image could be ray-traced to 108b, which is where the composite image appears.

Figure 6:
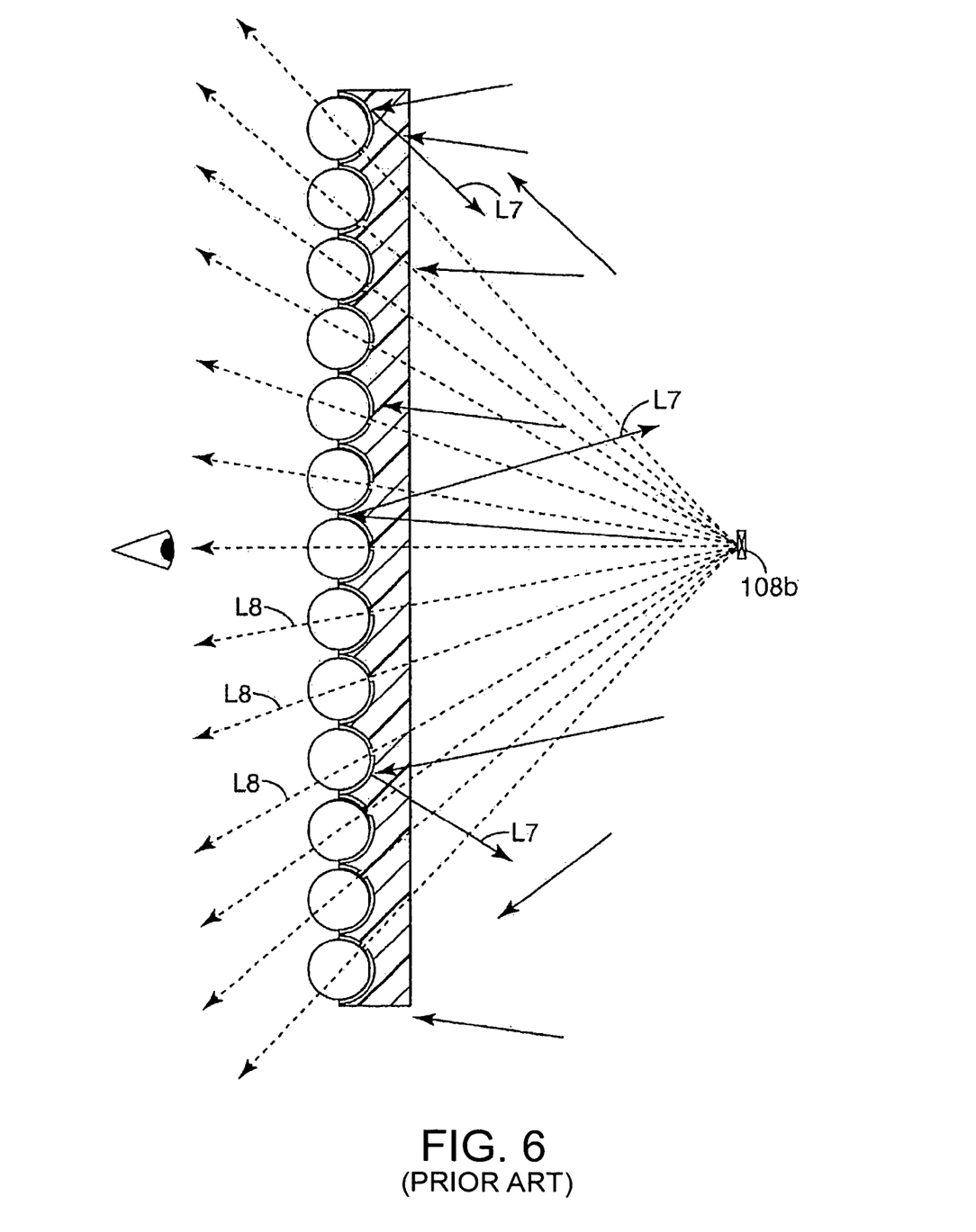
FIG. 6 is a schematic representation of a sheeting having a composite image that appears to float below the sheeting when the sheeting is viewed in transmitted light.

Certain imaged sheetings can be viewed by transmitted light, as shown in FIG. 6, which is a schematic representation of a sheeting having a composite image that appears to float below the sheeting when the sheeting is viewed in transmitted light. For example, when the imaged portions of the material layer are translucent and the non-imaged portions are not, most light L7 will be absorbed or reflected by the material layer, while transmitted light L8 will be passed through the imaged portions of the material layer. The extension of those rays back in the direction of the incident light results in the formation of a composite image at 108b. The composite image may be apparent at the focal point, where it may appear brighter than the remainder of the sheeting. If the imaged portions of the material layer are not translucent but the remainder of the material layer is, the absence of transmitted light in the areas of the images may provide a composite image that appears darker than the remainder of the sheeting.

It will be appreciated that in certain example embodiments, a sheeting having a composite image that appears to float below the sheeting can be viewed in reflected light and/or transmitted light.

3. Example Gauge Faces and Example Methods for Displaying Floating Images

Figure 7:
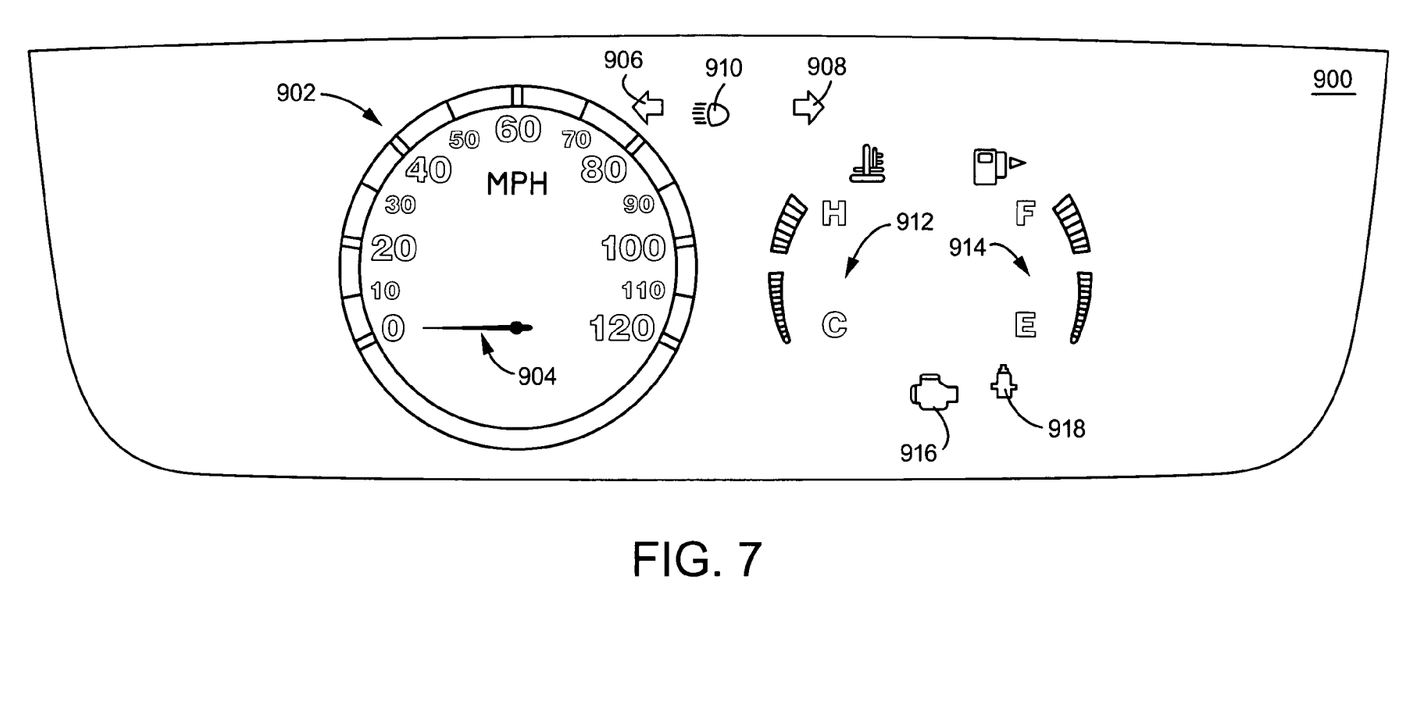
FIG. 7 is an illustrative plan view of a gauge face in accordance with an example embodiment; and, FIG. 8 is an illustrative flowchart for activating appropriate portions of a gauge face in accordance with an example embodiment.

FIG. 7 is an illustrative plan view of a gauge face in accordance with an example embodiment. It will be appreciated that the layout of FIG. 7 is for illustrative and non-limiting purposes only. Other example embodiments may include some, all, or none of the images shown in FIG. 7 arrayed in any number of different configurations. For example, such images may include directional/heading information, battery status, gear, radio station, etc. It also will be appreciated that the graphics described as floating above and/or below may appear above, below, or on the sheeting, depending on the particular embodiment.

In FIG. 7, gauge face 900 includes a number of images that may indicate certain operational parameters of the vehicle. Speedometer 902 (including in this example embodiment various speeds, an outline design, and an MPH label) is shown as a static image. In this example embodiment, speeds that are odd numbers multiplied by 10 are displayed as floating below gauge face 900, while speeds that are even numbers multiplied by 10 are shown as floating above gauge face 900. MPH is shown as being on the surface of gauge face 900. Needle 904 points to the appropriate speed at which the vehicle is traveling. In certain example embodiments, the current speed may be shown to be floating above gauge face 900, while other speeds (e.g. lower and/or higher speeds) may be shown as floating below the gauge face 900.

Gauge face 900 also includes left blinker indicator 906 and right blinker indicator 908. In certain example embodiments, those images may not appear at all until an appropriate blinker (and/or "flashers") is activated. In certain other example embodiments, left blinker indicator 906 and right blinker indicator 908 may float behind gauge face 900 until one or both are activated, at which time they may appear to float above gauge face 900. Similarly, high beam indicator 910 may appear hidden or as floating behind gauge face 900 until activated, at which time it may appear to float above gauge face 900.

Temperature indicator 912 may be comprised of static labels H, C, and temperature images. It also may be comprised of a three-dimensional indicator bar, which may originate in the background and extend outward as the temperature becomes hotter. In certain example embodiments, the outline and divisions of the indicator bar may be static, and one or more lights may effectively "fill in" the proper number of divisions to reflect the appropriate temperature. Fuel level 914 as shown is arranged similarly, with static labels F, E, and gas pump images, and a three-dimensional indicator bar.

Engine light 916 and seatbelt light 918 are shown as a static images. In certain example embodiments, they may appear only when triggered by an appropriate event. In certain example embodiments, they may appear as floating above gauge face 900 to alert the operator of trouble.

Figure 8:
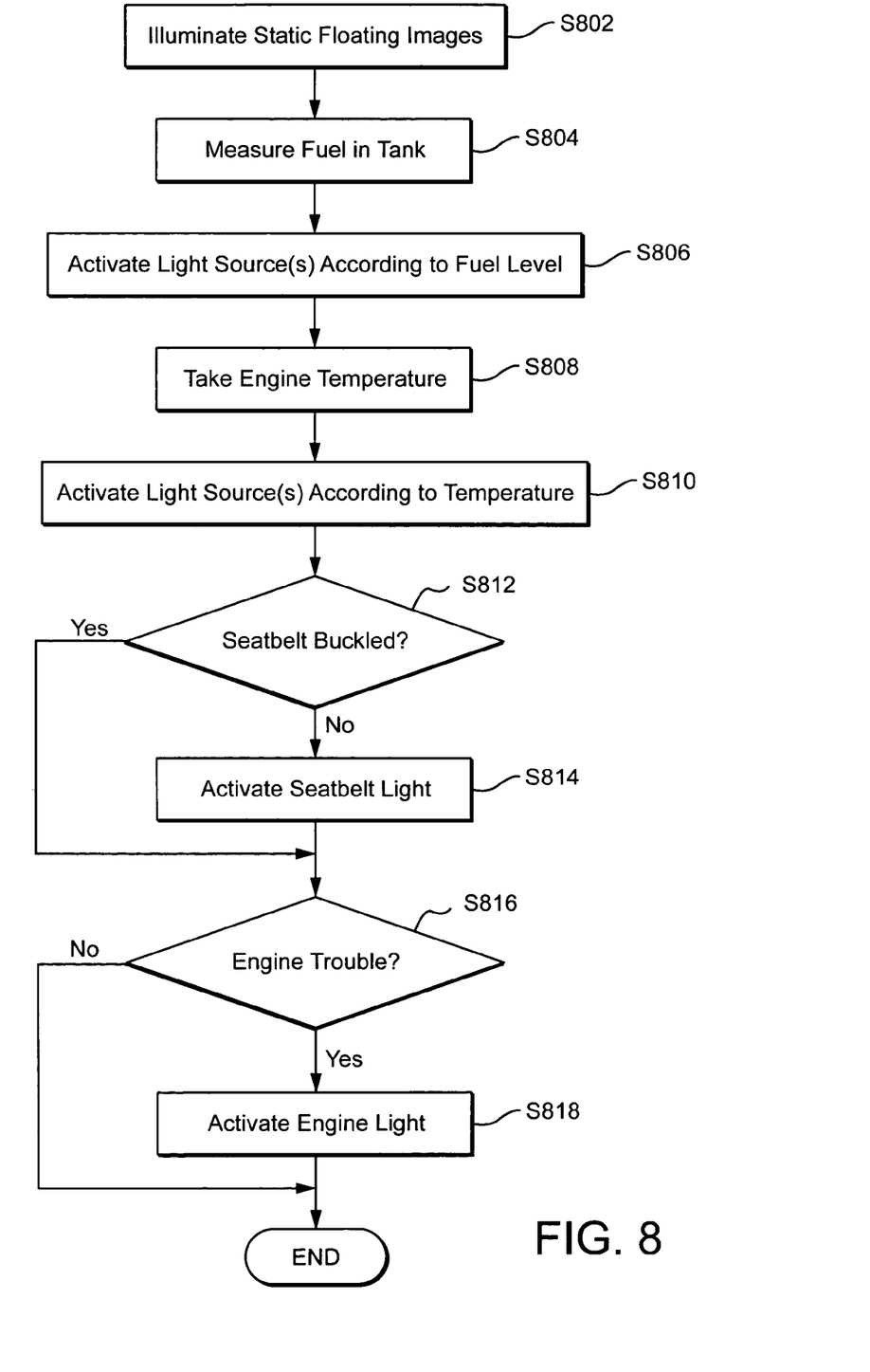

FIG. 8 is an illustrative flowchart for activating appropriate portions of a gauge face in accordance with an example embodiment. In step S802, static floating images are illuminated. For example, 902 speedometer shown in FIG. 7 may be illuminated in step S802 because it is always on when the vehicle is on. Step S804 measures the amount of fuel in the tank, and step S806 activates a light source related to the fuel level. It will be appreciated that rather than illuminating lights to indicate fuel level, certain example embodiments may use an analog needle. Similarly, step S809 measures the engine temperature, and step S810 activates a light source related to the temperature. Step S812 determines whether seatbelts (e.g. the operator's seatbelt) are buckled. If they are not, an appropriate light in actuated in step S814. Step S816 determines whether there is engine trouble. If there is engine trouble, an appropriate light in actuated in step S818. It will be appreciated that FIG. 8 is intended to show one non-limiting example of the illumination of appropriate images on vehicle startup. Other checks and indicators may be actuated through processes in addition to, or in place of, those shown of FIG. 8.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a vehicle dashboard including a gauge face, the method comprising:
    providing a first sheet including a microlens array;
    laser-etching a designed pattern into the first sheet, the designed pattern comprising at least first and second images;
    applying the first sheet to a second sheet;
    connecting at least one vehicle sensor to a plurality of light sources, the at least one vehicle sensor being operable to measure a status and/or parameter associated with the vehicle;
    locating the first and second sheets in a dashboard area of the vehicle;
    providing at least one said light source at a location in the vehicle to cause the first image to appear to an operator of the vehicle to be floating above and/or below the gauge face when said light source is turned on, said light source being turned on in response to one said vehicle sensor connected thereto, and
    providing at least two said light sources at locations in the vehicle to cause associated portions of the second image to appear to the operator of the vehicle to be floating above and/or below the gauge face when said at least two light sources are turned on, said at least two light sources being turned on in response to one said vehicle sensor connected thereto.

2. the method of claim 1, wherein the first sheet comprises vinyl.

3. The method of claim 1, wherein the at least one sensor is operable to measure one or more of vehicle speed, actuation of a vehicle turn signal, actuation of vehicle high beams, vehicle engine temperature, vehicle fuel level, vehicle engine trouble, and/or vehicle safety belt status.

4. The method of claim 1, wherein the images displayed vary based at least on one or more of the presence and/or absence of light, the amount of light, and/or the viewing angle.

5. A gauge face for a vehicle, comprising:
    a first sheet laser-etched with a design pattern comprising a plurality of images, the first sheet being applied to a second substantially transparent sheet;
    wherein a first image in the design pattern appears to an operator of the vehicle as floating above and/or below the gauge face when illuminated, and
    wherein portions of a second image in the design pattern appear to the operator of the vehicle as floating above and/or below the gauge face when selectively illuminated by a plurality of light source.

6. The gauge face of claim 5, wherein the first sheet comprises a vinyl inclusive sheet.

7. The gauge face of claim 5, wherein the second sheet comprises a polycarbonate inclusive sheet.

8. The gauge face of claim 5, further comprising a third sheet applied to the first sheet opposite the second sheet.

9. The gauge face of claim 5, wherein the images depict one or more of vehicle speed, actuation of a turn signal, actuation of high beams, engine temperature, fuel level, engine trouble, and/or safety belt status.

10. The gauge face of claim 5, wherein the first sheet is a retroflective sheet.

11. A method of displaying images that float above and/or below a gauge face of a vehicle in a vehicle dashboard, the method comprising:
    mounting the gauge face at a dashboard area of the vehicle;
    sensing a parameter associated with the vehicle;
    actuating one or more lights, at and/or behind the dashboard area of the vehicle, in response to the parameter sensed, each said light being associated with at least a portion of one said image; and
    wherein the gauge face is designed so that at least some images portrayed thereby appear to an operator of the vehicle to be floating above and/or below a plane of the guard face in a three dimensional manner, and
    wherein at least one said image is divided into portions such that the portions are selectively portrayed as floating above and/or below the plane of the guard face in response to selective actuation of the lights associated therewith in dependence on the parameter sensed.

12. The method of claim 11, wherein the images are not visible before one or more of the lights is actuated.

13. The method of claim 11, wherein already visible images change in appearance based on one or more of the light's presence, absence, and/or amount.

14. The method of claim 11, wherein the images indicate one or more of vehicle speed, actuation of a turn signal, actuation of high beams, engine temperature, fuel level, engine trouble, and/or safety belt status.

* * * * *